UNITED STATES PATENT OFFICE.

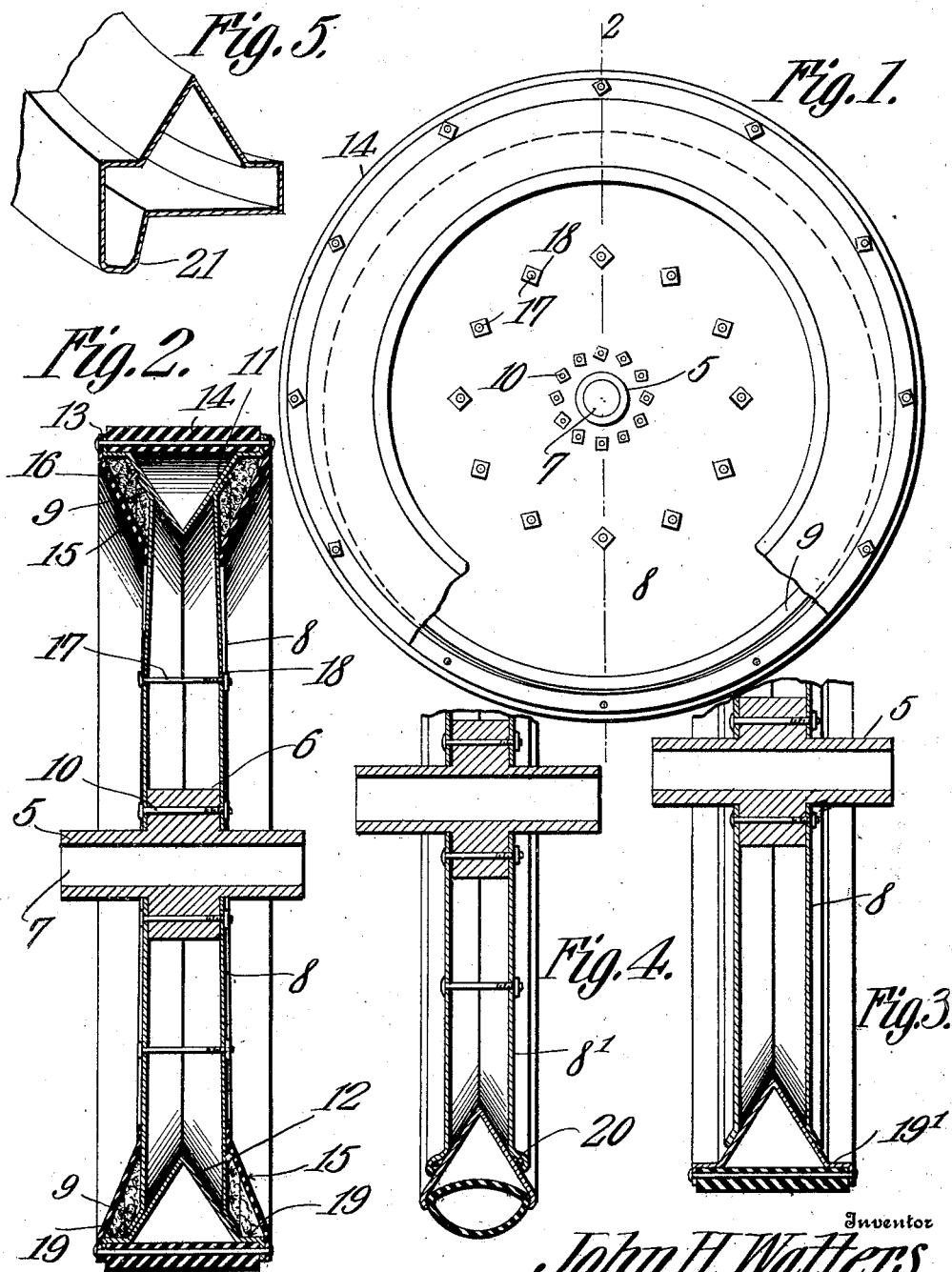

JOHN HENRY WATTERS, OF AUGUSTA, GEORGIA.

VEHICLE-WHEEL.

956,459.  Specification of Letters Patent.  Patented Apr. 26, 1910.

Application filed June 23, 1908. Serial No. 439,999.

*To all whom it may concern:*

Be it known that I, JOHN HENRY WATTERS, a citizen of the United States, residing at Augusta, in the county of Richmond and State of Georgia, have invented a new and useful Vehicle-Wheel, of which the following is a specification.

This invention relates to vehicle wheels and has for its object to provide a strong, durable and thoroughly efficient wheel having a depressible rim, which serves to cushion the wheel and thus prevent injury to the felly and springs when traveling over rough uneven roads.

A further object of the invention is to provide a wheel having flexible side plates and provided with a rim having inclined walls adapted to fit between and frictionally engage the side plates.

A further object is to provide flexible side flanges or guards arranged to bear against the side plates of the wheel thereby to prevent the entrance of dust and dirt to the rim, said flexible flanges or guards being spaced from the peripheral edges of the side plates to form a pocket for the reception of a lubricant.

A further object is to provide means for limiting the inward movement of the depressible rim, and means for regulating the tension of the side plates of the wheel.

Further objects and advantages will appear in the following description, it being understood that various changes in form, proportions and minor details of construction may be resorted to within the scope of the appended claims.

In the accompanying drawings forming a part of this specification: Figure 1 is a side elevation of a wheel constructed in accordance with my invention. Fig. 2 is a vertical sectional view taken on the line 2—2 of Fig. 1. Fig. 3 is a vertical sectional view showing the wheel in normal position, that is to say without any weight thereon, the flexible flange being removed. Fig. 4 is a similar view illustrating a modified form of the invention. Fig. 5 is a detail perspective view of a portion of a rim illustrating a further modification.

Similar numerals of reference indicate corresponding parts in all of the figures of the drawings.

The improved wheel forming the subject matter of the present invention includes a hub 5 having an annular flange or enlargement 6 and provided with a longitudinally disposed bore 7 for the reception of the axle, as shown.

Secured to the opposite side faces of the flange 6 are spaced plates 8 preferably formed of spring metal and having their peripheral edges bent laterally to form terminal outwardly inclined lips 9, said plates being rigidly secured to the enlargement or flange 6 by bolts or similar fastening devices 10.

The wheel is provided with a depressible rim 11 preferably stamped or otherwise formed from sheet metal and provided with an inwardly extending rib 12, preferably V shaped in cross section, and arranged to bear against and frictionally engage the lips 9. The opposite longitudinal edges of the rim 11 are off set to form annular flanges 13 between which is seated a tire 14.

Bolted or otherwise rigidly secured to the flanges 13 are yieldable guard flanges 15, preferably formed of rubber and arranged to bear against the side plates 8 thereby to prevent the entrance of dust and other foreign matter to the lips 9. The intermediate portions of the guard flanges 15 are spaced from the lips 9 to produce pockets 16 for the reception of cotton waste, oil or other suitable lubricant so as to permit the rib of the rim to slide freely between the lips 9 of the side plates when the wheel is in motion. The side plates 8 are perforated for the reception of suitable bolts 17 having threaded terminals for engagement with clamping nuts 18 whereby the side plates may be adjusted so as to regulate the tension of the same.

Attention is here called to the fact that the rim 11 is provided with oppositely disposed stop shoulders 19 which bear against the lips 9 and serve to limit the inward movement of the rim, the resiliency of the rim being regulated by adjusting the bolts 17, in the manner before stated. It will thus be seen that when the wheel is in motion that portion of the rim or tire below the hub and in engagement with the ground will be forced upwardly to the position shown in the lower portion of Fig. 2 of the drawing, a corresponding movement being imparted to that portion of the tire or rim above the hub of the wheel, thus causing the position of the rim to constantly change so as to prevent injury to the wheel when traveling over rough uneven roads.

In Fig. 4 of the drawings there is illustrated a modified form of the invention in which the side flanges or guards 15 are dispensed with the peripheral edges of the plates 8' being bent laterally to produce pockets 20 for the reception of cotton waste, oil or other lubricant.

A further modification is shown in Fig. 5 of the drawing in which the rim of the wheel is formed with an annular flange 21, this form of device being principally designed for use on car wheels.

Having thus described the invention what is claimed is:

1. A vehicle wheel including a hub having side plates secured thereto, a depressible rim having a substantially V shaped rib interposed between the plates, and yieldable guard flanges carried by the rim and slidably engaging the side plates, said guard flanges being spaced from the rim to form pockets for the reception of a lubricant.

2. A vehicle wheel including a hub, side plates secured to the hub and provided with laterally extending lips, a depressible rim having a V shaped rib slidably engaging the lips, a tire carried by the rim, yieldable guard flanges secured to the rim and slidably engaging the exterior walls of the side plates, said yieldable flanges being spaced from the side plates to form pockets for the reception of a lubricant.

3. A wheel comprising a hub, spaced duplicate parallel resilient side plates rigidly secured to said hub and having outwardly inclined lips at their outer edges, and a rim provided on its inner face with a central annular rib extending between said lips and having its opposite sides inclined to fit directly against and slidably engage the same whereby the rim will be held in position solely by the resiliency of the side plates.

In testimony that I claim the foregoing as my own, I have hereto affixed my signature in the presence of two witnesses.

JOHN HENRY WATTERS.

Witnesses:
 THOS. J. POPE,
 ALBERT G. INGRAM.